Dec. 16, 1958   F. BARTU ET AL   2,864,602
REVERBERATORY FURNACE
Filed Dec. 17, 1954
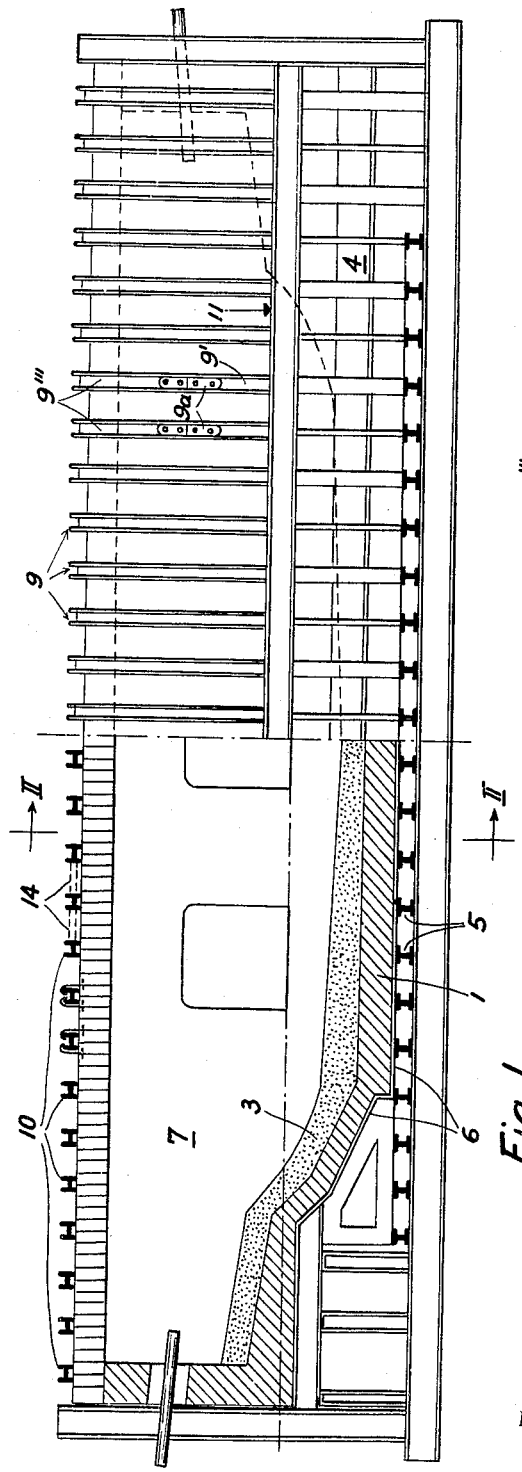
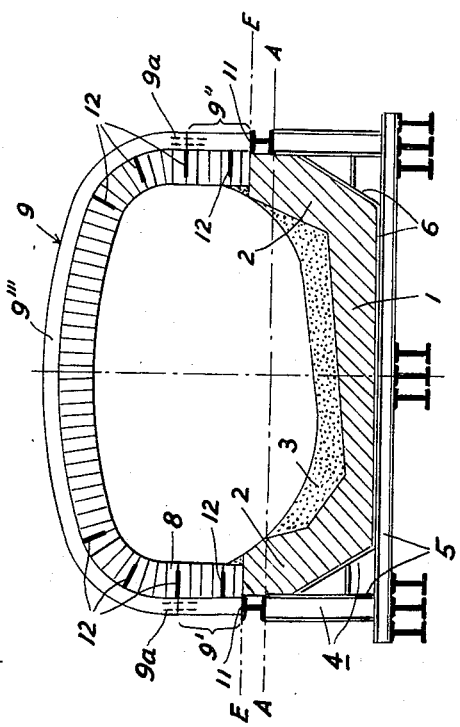
INVENTOR
Franz Bartu
Alfred Slesaczek
BY
ATTORNEYS

United States Patent Office 2,864,602
Patented Dec. 16, 1958

2,864,602

REVERBERATORY FURNACE

Franz Bartu, Zurich, and Alfred Slesaczek, Kusnacht, near Zurich, Switzerland, assignors to Maerz Industrie-Ofenbau A. G., Zurich, Switzerland Application December 17, 1954, Serial No. 484,544

Claims priority, application Austria December 17, 1953

4 Claims. (Cl. 263—46)

This invention relates to reverberatory furnaces and especially to open hearth furnaces.

Reverberatory furnaces, such as Siemens-Martin furnaces or the like, consist of a hearth for the liquid or solid material, and a furnace chamber which is located above the hearth and through which the flames or heating gases pass. The base and sides of the hearth are formed of hearth brickwork of furnace chamber bricks; similarly, the laboratory above the hearth is closed off to the outside by refractory bricks. The steel framework of a furnace of this type has hitherto consisted of the support for the hearth and of side posts, profiles, slabs, bars and the like which are disposed perpendicularly or at an incline and are connected by cross-tie rods above and below the furnace brickwork. These tie-rods are intended to take the pressure of the hearth brickwork (caused by the load of the hearth and the thermal expansion of the brickwork), the bearing pressure of the arch, and the pressure of the outward inclined side walls of the furnace. In more recent designs of reverberatory furnaces the cross-tie rods have been replaced by profiles and rigid frames which lie in the cross-sections of the walls of the furnace chamber and in which the brickwork is inserted.

Since suspended constructions are now used for the furnace chamber brickwork, for example suspended roofs, the aforementioned frames are used as a supporting framework which is intended to transmit the load of the suspended brickwork and the weight of the metallic suspension structure to the support. For this purpose, the so-called carrying members are fixed at the said supporting framework, the bricks of the furnace chamber wall being suspended on said carrying members by suspension means, for example suspension irons, hangers, bolts, wires, and the like. The carrying members are either shaped so as to correspond to the outer surface of the furnace chamber brickwork, for example bent concentrically to the roof surface in the case of a curved suspended roof, in which case uniformly dimensioned suspension means may be used, or else the carrying members have a shape differing from the outer contour of the furnace chamber brickwork, so that suspension means of varying lengths are necessary.

The previously described hitherto known frame for reverberatory furnaces, especially open hearth furnaces, has, however, great disadvantages, particularly when the construction of the entire brickwork of the furnace chamber, i. e. not only the roof but also the front and back walls thereof, is to be suspended. In this case, the rigid cross frames, serving as supporting framework of the furnace and the additional carrying members, require a large amount of space, which greatly limits the size of the furnace chamber, and particularly the width of the hearth. Moreover, the bricks suspended on the carrying members are very difficult to reach from outside, so that one of the main advantages of the suspension construction, i. e. to interchange the individual bricks or batches of bricks from the outside, is lost. Finally, the entire furnace framework also becomes relatively complicated and expensive.

The present invention aims at providing a reverberatory furnace, especially a Siemens-Martin furnace, which avoids the disadvantages described above.

To this end, according to the invention, the reverberatory furnace is provided with a frame for the furnace chamber brickwork which is supported against abutments and is adapted to the outside shape of the furnace profile and with which at least individual bricks or groups of bricks of the furnace chamber brickwork are suspended. The abutments for supporting the framework of the furnace chamber brickwork are advantageously placed on the structure of the hearth brickwork, which structure has the form of a rigid trough, which is preferably constructed from profiles and sheets. The supporting framework advantageously consists of several carrying members, which lie in cross-sections of the furnace and which may either be constructed to be continuous from the front to the back abutments of the trough, or else may consist of at least two consecutive parts from the front to the back abutment.

The construction, in accordance with the invention, for the reverberatory furnace and its framework, provides the following extraordinary advantages:

The frame of the furnace chamber brickwork, which advantageously consists of several carrying members, is completely unaffected by the pressures occurring in the bottom of the hearth; in adapting it to the suspension construction it may be designed in such a way that all the advantages of the suspension construction come to effect completely. Furthermore individual bricks or groups of bricks of the suspended brickwork of the furnace chamber are easily accessible and may also easily be replaced or repaired. More, the frame of the reverberatory furnace of the invention is distinguished by a simple structure, small steel requirements, and inexpensive manufacture, since with such frame the carrying members are used at the same time as supporting framework in contradistinction to the framework designs used up to now, in which it is necessary to provide, on the supporting frames of the cross-sections of the furnace, additional carrying members for securing the suspended bricks.

The hereindescribed furnace chamber brickwork frame may also be easily transported by means of lifting equipment. Thus the entire furnace chamber brickwork is rendered accessible in the best possible manner from all sides, when furnace repairs or adjustment are necessary, and clearing out of the brickwork of an old hearth is also considerably facilitated. Furthermore, it is possible, by means of the frame, to remove the entire brickwork of the furnace chamber or parts thereof, when worn, and to replace the same in a simple manner by parts which have already been prefabricated outside the furnace. Individual carrying members or parts thereof may also easily be replaced by new ones, independently of the hearth trough. Finally, in the case of bricks suspended in a non-perpendicular manner, the weight components produced by such suspension or the pressure thus occurring in the radial joints of the furnace chamber brickwork are easily transmitted to the frame; for this purpose it is only necessary to provide stops or projections on the carrying members, which engage in the radial joints of the furnace chamber brickwork and take the pressures acting normally on the radial joints.

In order to enable the invention to be more readily understood, reference is made to the accompanying drawings which illustrate diagrammatically and by way of example one embodiment thereof, and in which:

Figure 1 is partly a longitudinal section of the furnace and partly a back elevation; and Figure 2 is a cross-section on the line II—II of Figure 1.

1 denotes the brickwork of the base of the hearth, 2 the side parts of the hearth, and 3 the rammed or sintered layer on the fireside of the hearth. The complete hearth consisting of the parts 1, 2 and 3 is supported by a rigid trough 4 and surrounded by the latter, which is built by profiles 5 and sheets 6. The side parts 2, 2 of the hearth extend in many cases slightly above the maximum surface level A—A of the bath up to the plane E—E, adjoining the brickwork 8 of the furnace chamber 7. All or part of the bricks of the furnace chamber brickwork 8 are suspended on or fixed at the carrying members 9 either directly or indirectly.

The carrying members 9, which, as a whole, are designated supporting framework 10, lie in cross-sectional planes of the furnace and run concentrically to the outside of the furnace cross-section, that is to say they are adapted as far as possible to the outside shape of the furnace. The carrying members 9 are supported on the rigid trough 4 which is provided for this purpose with abutments 11. The carrying members 9 may be constructed to be self-supporting and continuous from the front to the back abutment 11. Several or all the carrying members 9 may also be combined into groups or into a unit by transverse connections, as indicated by dot-dash lines 14 in Figure 1. Finally, the carrying members 9 may also consist of at least two consecutive parts from the front to the back abutments 11. In the embodiment illustrated, the carrying members 9 consist of three parts 9', 9" and 9'''. The parts 9', 9", 9''' are connected together so as to transmit forces, by suitable connections 9a. In the embodiment illustrated, the parts 9', 9", run on the front and back wall of the furnace chamber, while the part 9''' extends over the furnace chamber.

The bricks of the furnace chamber brickwork 8, which are suspended on the carrying members 9 by means of suspension means such as suspension irons, hooks, bolts, wires, and so on, assume, on the top of the furnace profile, a perpendicular position, while at the abutments on the hearth trough 1, 2, 3 at least they assume a horizontal position and a more or less inclined position in between. Consequently at the bricks situated at the top, the total weight of the bricks suspended there is transmitted by the suspension means to the carrying members, while the suspension means in the side parts of the furnace profile can only partly undertake this function. At all bricks out of the perpendicular, additional weight components are produced from the weight of the bricks, which additional weight components exert a pressure on the adjoining bricks. These pressures are the greater the farther away the bricks are from the top of the profile and have a disadvantageous effect on the life of the bricks. In addition, the pressures are increased when heating the furnace owing to the thermal expansion of the bricks. For this reason, stops or projections 12 which engage in the radial joints situated there, of the furnace chamber brickwork 8 and which transmit pressures acting transversely to said radial joints to the carrying members 9, are provided on the carrying members at selected points, for example at certain distances. The projections 12 may for example consist of plates welded onto the carrying members 9.

What we claim is:

1. An open hearth furnace comprising a refractory hearth adapted to contain a bath, a rigid metallic trough supporting the hearth extending beneath the hearth and along the front and back of the hearth, and including front and back metallic abutments running horizontally along the front and back of the furnace above the level of the top of the hearth, and arch of brick, said arch having vertical legs extending up from the hearth at the front and back and said arch thence extending across the top of the furnace chamber, an arch-shaped metallic frame conforming to the shape of and adjacent the outside of the arch of brick and having vertical legs, said arch-shaped frame being coextensive with said arch of brick from the top of said hearth and the legs of said frame being supported respectively on the front and back abutments, and suspension means supporting brick at spaced intervals in each of said vertical legs of the arch of brick to the vertical legs of said frame.

2. An open hearth furnace of claim 1, in which the brick in said arch of brick have a substantially perpendicular disposition over said furnace chamber, are turned progressively to a substantially horizontal disposition in said legs of the arch of brick, and said suspension means includes rigid projections extending between the brick at intervals in said vertical legs of the arch of brick from the vertical legs of said arch-shaped metallic frame.

3. An open hearth furnace of claim 1, in which said arch-shaped frame includes a plurality of arch-shaped carrying members spaced from each other, longitudinally of said abutments, and connectors interconnecting said carrying members transversely of said members.

4. An open hearth furnace of claim 1, in which said arch-shaped frame includes a pluarlity of arch-shaped carrying members spaced from each other, longitudinally of said abutments, each of said arch-shaped carrying members consisting of at least three parts connected end to end, two of said parts respectively extending upward along the legs of said arch of brick and the other of said parts extending over said arch of brick across the top of said furnace chamber.

References Cited in the file of this patent

UNITED STATES PATENTS

| | | |
|---|---|---|
| 1,400,335 | Wensiulus | Dec. 13, 1921 |
| 1,447,682 | Moats | Mar. 6, 1923 |
| 1,500,240 | Griffith | July 8, 1924 |
| 2,209,786 | McCarroll et al. | July 30, 1940 |
| 2,402,339 | Morgan | June 18, 1946 |
| 2,698,588 | Davies | Jan. 4, 1955 |